United States Patent
Iasillo et al.

(10) Patent No.: US 7,770,400 B2
(45) Date of Patent: Aug. 10, 2010

(54) NON-LINEAR FUEL TRANSFERS FOR GAS TURBINES

(75) Inventors: Robert J. Iasillo, Simpsonville, SC (US); Jason D. Fuller, Simpsonville, SC (US); Steve W. Backman, Simpsonville, SC (US); Samuel Ernst-Fortin, Norcorss, GA (US)

(73) Assignee: General Electric Company, Schenectady, NY (US)

( * ) Notice: Subject to any disclaimer, the term of this patent is extended or adjusted under 35 U.S.C. 154(b) by 896 days.

(21) Appl. No.: 11/645,367

(22) Filed: Dec. 26, 2006

(65) Prior Publication Data

US 2008/0154474 A1     Jun. 26, 2008

(51) Int. Cl.
F02C 7/22    (2006.01)
F02C 7/26    (2006.01)

(52) U.S. Cl. .................. 60/776; 60/39.281
(58) Field of Classification Search ............ 60/772, 60/773, 776, 39.281
See application file for complete search history.

(56) References Cited

U.S. PATENT DOCUMENTS

| | | | |
|---|---|---|---|
| 3,948,043 A * | 4/1976 | Martz ................ | 60/243 |
| 3,978,659 A * | 9/1976 | Smith et al. ........ | 60/39.281 |
| 3,979,904 A * | 9/1976 | Hobbs ................ | 60/790 |
| 4,039,804 A * | 8/1977 | Reed et al. .......... | 700/287 |
| 4,442,665 A * | 4/1984 | Fick et al. .......... | 60/39.12 |
| 5,617,716 A * | 4/1997 | Schreiber et al. .... | 60/775 |
| 6,729,135 B1 * | 5/2004 | Norris et al. ........ | 60/646 |
| 2006/0150631 A1 * | 7/2006 | Smith et al. ........ | 60/772 |
| 2007/0101720 A1 * | 5/2007 | Kunkle et al. ....... | 60/646 |
| 2007/0101723 A1 * | 5/2007 | Kunkle et al. ....... | 60/772 |
| 2008/0098746 A1 * | 5/2008 | Iasillo et al. ....... | 60/776 |

OTHER PUBLICATIONS

U.S. Appl. No. 11/586,763, filed Oct. 26, 2006, Iasillo, Robert.

* cited by examiner

*Primary Examiner*—William H Rodriguez
(74) *Attorney, Agent, or Firm*—Edward J. Smith; Ernest G. Cusick; Frank A. Landgraff

(57) ABSTRACT

A method for controlling the rate of transfer between operation with gas and liquid fuel types to minimize the time in undesirable operational mode, thereby preventing excessive wear and damage to gas turbine hardware. The method includes completing a fuel prefill for the oncoming fuel type through the fuel system and determining if a total fuel demand for the oncoming fuel type is greater than a predetermined flow rate for the oncoming fuel type. The method also includes selecting a fuel transfer rate and transferring from the offgoing fuel type to the oncoming fuel type at the selected fuel transfer rate. Further, the method includes determining if the offgoing fuel flowrate has decreased below a predetermined flow rate for the offgoing fuel type, selecting a final fuel transfer rate and completing the transfer from offgoing fuel type to oncoming fuel type at a selected final fuel transfer rate.

20 Claims, 11 Drawing Sheets

NON-LINEAR FUEL TRANSFERS FOR GAS TURBINES

BACKGROUND OF THE INVENTION

The invention relates generally to a method for gas turbine control and more specifically to a method for controlling the rate of transfer between operation with gas and liquid fuel types to minimize the time in undesirable operational modes, thereby preventing excessive wear and damage to gas turbine combustion hardware.

Industrial gas turbines are often capable of alternatively running on liquid and gaseous fuels, e.g., natural gas. These gas turbines have fuel supply systems for both liquid and gas fuels. The gas turbines generally do not burn both gas and liquid fuels at the same time. Rather, when the gas turbine burns liquid fuel, the gas fuel supply is turned off. Similarly, when the gas turbine burns gaseous fuel, the liquid fuel supply is turned off. Fuel transfers occur during the operation of the gas turbine as the fuel supply is switched from liquid fuel to gaseous fuel, and vice versa.

Gas turbines that burn both liquid and gaseous fuel require a liquid fuel purge system to clear the fuel nozzles in the combustors of liquid fuel. The liquid fuel supply system is generally turned off when a gas turbine operates on gaseous fuel. When the liquid fuel system is turned off, the purge system operates to flush out any remaining liquid fuel from the nozzles of the combustor and provide continuous cooling airflow to the nozzles.

FIG. 1 is a simplified schematic diagram of an exemplary gas turbine having liquid and gas fuel systems. FIG. 1 shows schematically a gas turbine 100 having liquid fuel system 102 and a liquid fuel purge system 104. The gas turbine is also capable of running on a gas, such as natural gas, and includes a gaseous fuel system 106. Other major components of the gas turbine include a main compressor 108, a combustor 110, a turbine 112 and a controller 114. The power output of the gas turbine 112 is a rotating turbine shaft 116, which may be coupled to a generator 130 that produces electric power.

In the exemplary industrial gas turbine shown, the combustor may be an annular array of combustion chambers, i.e., cans 118, each of which has a liquid fuel nozzle 120 and a gas fuel nozzle 122 (a single combustor may have one or more gas or liquid fuel nozzle depending on design). The combustor may alternatively be an annular chamber. Combustion is initiated within the combustion cans at points slightly downstream of the nozzles. Air from the compressor 108 flows around and through the combustion cans 118 to provide oxygen for combustion. Moreover, water injection nozzles 124 are arranged within the combustor 110 to add energy to the hot combustion gases.

The air for the liquid fuel system purge may be provided from the compressor 108, boosted by a purge air compressor (not shown) and controlled by other elements of the system (not shown). When the gas turbine 100 operates on natural gas (or other gaseous fuel), the liquid fuel purge system 104 blows compressed air into the liquid fuel system 102 through the liquid fuel nozzles 120 of the liquid fuel 102 system to purge liquid fuel and provide a flow of continuous cooling air to the liquid fuel nozzles 120. Similarly, when the gas turbine 100 operates on liquid fuel, the gas fuel purge system 128 blows compressed air into the gas fuel system 106 to purge gas fuel and cool the gas fuel nozzles 122.

FIG. 2 is a simplified diagram of a gas turbine engine with an existing liquid fuel system. Liquid fuel is provided to the liquid fuel system 200 from a liquid fuel source 205. The liquid fuel system 200 includes a flowpath to a flow divider 230 through a low-pressure filter 210, a fuel pump 215, a bypass control valve 220, and a stop valve 225. Pressure relief valve 235, bypass control valve 220 and stop valve 225 may recirculate liquid fuel flow through recirculation line 240 to the upstream side of the low-pressure filter 210. The flow divider 230 divides liquid fuel flow into a plurality of liquid fuel flow paths leading to individual combustion cans 270. Each liquid fuel flow path downstream of the flow divider includes a 3-way (endcover) valve 245 and a distribution valve 260 before entering the combustion can 270.

Three-way valve 245 permits flow to the combustion can nozzles from the liquid fuel flow path (described above) or from a liquid fuel purge air system 280. Three-way valve 245 is designed to selectably allow flow to the combustor nozzles 120 from the liquid fuel while preventing backflow of fuel to the liquid fuel purge air system or to allow purge air to the combustor nozzles 120 while preventing backflow of purge air into the liquid fuel system upstream of the three-way valve. By preventing purge air from entering the liquid fuel system, the air-fuel interfaces with the fuel supply are minimized.

When gas fuel is supplying the turbine, the 3-way valve 245 is positioned to block liquid fuel flow and allow purge air to pass for cooling the fuel nozzles in the combustor. This purge must be shut off when liquid fuel is turned on. The 3-way (endcover) isolation valve separate the purge air from the liquid fuel. The fuel system does not require this hardware; the use of 2 check valves, or 2 way on/off valves could be employed.

FIG. 3 illustrates a simplified gas fuel system. The gas fuel system 300 includes a gas fuel source 305 and a purge air source 340. The gas fuel system further includes a gas stop valve 310, a gas vent valve 315, and gas control valves 320. Gas control valves 320 controls the amount of gas fuel admitted to manifolds 325 and the associated gas nozzles 330 downstream of the manifolds 325.

The purge air source 340 provides compressed air to the combustor gas nozzles to purge the piping and nozzles of gas when using the gas fuel and to cool the gas nozzles when the gas fuel is no longer supplying the gas turbine. Each line to an individual manifold 325 includes blocking valves 345 and 350 (to satisfy leakage requirements and ensure air and fuel do not mix), vent valve 355, and an orifice 360 for limiting purge air flow.

Several problems may arise in a gas turbine during low fuel flows. When on liquid fuel and transferring to gas, the turbine experiences low gas fuel flow for a certain period of time while gas fuel is being ramped on, and liquid fuel ramped off. At the end of this same transfer, low liquid fuel flow is seen at the end of the transfer when the unit is nearly on 100% gas fuel. Similarly, on gas fuel transferring to liquid fuel there are periods of low flow operation at the beginning of the transfer when liquid begins to come on, and at the end of the transfer when gas is nearly off.

When on gas fuel and operating at low fuel flows, inaccuracies in gas control valve(s) allow for the potential of incorrect fuel split scheduling. This incorrect gas fuel split can cause high combustion dynamics, which leads to potential combustion hardware damage and increased wear. As gas fuel flow drops the nozzle pressure ratio drops. The nozzles are designed for a minimum steady state pressure ratio (1.025 typically), and this is done to avoid a dynamic coupling between the fuel system and combustor. During fuel transfers this minimum ratio is temporarily violated. Where that violation occurs is a function of the load on the turbine at the time of the transfer and the number of gas fuel circuits in operation during the transfer. This is a source of combustion dynamics leading to potential damage and gas fuel nozzle wear.

Similar equipment wear and potential damage is possible on the liquid fuel nozzle at low liquid fuel flows. The typical gas turbine uses a can annular system where the combustion cans are located at different elevations. Currently a mechanical flow divider (connected positive displacement pumps) is used in the liquid fuel system to compensate for this head difference, mostly for the very low flow condition during the startup of the unit. A single can within the liquid fuel system may consist of numerous cartridges (nozzles). Due to elevation differences between the cartridges and head effects of the liquid fuel within the can, the highest cartridge will lose liquid fuel flow first.

FIG. 4 illustrates differences in head driving liquid fuel source 370 to flow through liquid fuel nozzles within a combustor can be dependent on nozzle positions. A side elevation for two simplified combustor cans 410 and 450 are shown, where combustor can 410 is higher than combustor can 450 by height $H_1$. Combustor can 410 has two nozzles 415 and 420 separated by height $H_2$. Combustor can 450 has two nozzles 455 and 460 also at different elevations. The flow divider 230 ensures an appropriate distribution of liquid fuel flow to each of the individual cans. However, the nozzles within an individual cans are at different elevations. The lower nozzles therefore have different flows based on the different head due to elevation. There is no mechanism to evenly divide the flow to all nozzles at different elevations. The highest cartridges with the least flow head behind the fuel receives the least fuel flow. These highest cartridges then experience increased wear and potential damage between the period of time when liquid fuel stops flowing through them, and liquid fuel purge is initiated. Purge flow cannot be turned on until liquid fuel has stopped flowing as there is a significant risk of introducing liquid fuel into the purge system.

Both high combustion dynamics due to inaccurate gas fuel splits/low pressure ratio across the fuel nozzles and the potential for damage/increased wear due to low liquid fuel flows prior to purge initiation are problems corrected by the present inventive method.

Historically, the transfer between gas and liquid fuel operation has been controlled with a constant, selectable, ramp rate that reduces one fuel and increases the other correspondingly. During a liquid to gas fuel transfer, the gas fuel button is selected from the operator screen. Once all conditions for fuel transfer are met and a gas prefill is completed, the liquid fuel is slowly ramped off at a constant rate until liquid fuel flow is reduced to 0%. At the same time gas fuel flow is increased until reaching 100%. Halfway through the transfer, the turbine will be running on 50% liquid and 50% gas fuel. The basic building blocks of the fuel transfers are used for operation of "Mixed Fuel" where both fuels are held at some split, as part of steady state operation. There has always been a minimum allowable steady state split between the fuels to avoid some of the issues described herein during the transient transfer.

At low gas fuel flow levels, gas control valve accuracy can vary widely from expected. A requested position of 5% stroke might be expected to flow 5% of valve capacity (linear relationship), but instead the valve may be flowing 5%+/−3% of its capacity. This gas fuel flow error results because the gas control valve is not typically calibrated below 10% stroke, as the turbine is not intended to run with valves in these low stroke conditions for any length of time. The inaccuracy at low gas control valve strokes will cause incorrect fuel splits to be sent into the combustor and lead to high dynamics within the combustion system. High dynamics are known to increase combustion system wear and decrease part life.

At low liquid fuel flows field-testing has shown there is not enough head pressure to provide sufficient liquid flow to all liquid fuel nozzle cartridges. Increased fuel nozzle wear and potential damage occurs while on low liquid fuel flow prior to initiation of purge airflow.

During a transfer from one fuel source to another, it is desired that continuity of turbine output power be maintained while minimizing any undershoots or overshoots of output power and temperature. In a transfer from operation with a gas fuel to operation with a liquid fuel, the 3-way valve 245 is switched to the liquid fuel line, the stop valve is opened, and the control valve is commanded to some small prefill flow. As the liquid fuel line is prefilled, the gas fuel is held at a required demand reference for the generator output output. The liquid fuel must refill the piping, which was previously filled with purge air, before liquid fuel reaches the combustor nozzles 120.

Controlled fuel is fuel that is provided to the combustors in response to a fuel reference demand for a given power output. Uncontrolled fuel is fuel that is introduced to the combustors, but which is not recognized in the turbine control fuel demand signals. Liquid fuel prefill is not included in the fuel demand calculation to avoid a detrimental dip in load if the liquid fuel prefill does not reach the combustors as expected, thus creating an under-fueled condition. The side effects of the uncontrolled fuel reaching the combustors is to supply additional energy resulting in an initial load and temperature spike and then causing global fuel demand to be driven down over time to hold the same load output.

Prefill rates may be limited by operational procedures at specific gas turbines, which may be administratively changed. However, high prefill rates may also affect the initial load and temperature spikes described above. Therefore, it may not be possible to implement higher prefill flow rates without incurring penalties in the form or undesirable or unacceptable load and temperature transients.

FIG. 5 illustrates a prior art algorithm for control of a transfer between fuel types. For exemplary purposes the fuel types are described as fuel "A" and fuel "B". The algorithm provides for a transfer from fuel "A" to fuel "B". Initially in step 510, the fuel type to which the load will be transferred is selected and designated as fuel "A". In step 520, a fuel prefill is completed with fuel "A". In step 530, it is determined whether the load is currently being powered by gas fuel, meaning that the load is being switched to liquid fuel (fuel "A" is liquid fuel). If fuel "A" is liquid fuel, then in step 540 a constant first fuel transfer ramp rate is selected. If the load is not being switched to the liquid fuel (but to gas fuel), then in step 550 a constant second fuel transfer rate is selected. The first fuel transfer ramp rate may be higher (usually twice as high) than the second fuel transfer ramp rate to recognize that the slow fuel supply is gas and that a transfer to a liquid fuel may be an emergency shift which requires a faster transfer to prevent loss of load. In step 560 the percent fuel "A" is increased at the fuel transfer ramp rate and the percent fuel "B" is decreased at the fuel transfer ramp rate. In step 570, a check is performed to determine whether operation with 100% fuel "A" has been achieved. If 100% fuel "A" operation has been achieved, then the transfer is complete in step 580. If 100% operation with fuel "A" has not been achieved then step 560 is continued until full fuel "A" operation has been achieved.

FIG. 6 illustrates simplified fuel transfer rates for fuel transfers from fuel "A" to fuel "B", and for transfers from fuel "B" to fuel "A" under the prior art method. The vertical axis represents the percent of a fuel type that is being supplied during two fuel transfer operations. The horizontal axis represents an unsealed time axis showing the relative transfer times during the two fuel transfer operations. The solid curve 610 represents fuel type "A". The dashed line 620 represents fuel type "B". For fuel transfer from fuel "A" to fuel "B", the slope (transfer rate) is twice at high as the slope (transfer rate) from fuel "B" to fuel "A". Consequently, the transfer time 630 for a fuel transfer from fuel "B" to fuel "A" is twice that of the reverse transfer 640. The fuel transfer rates are linear, reflecting a constant transfer rate throughout the process. FIG. 6 also illustrates a prefill process 650 for the transfers. Prefilling is performed by supplying the fuel which is to pick up the load earlier than demanded by turbine load control signals in order to ensure that the fuel supply lines for the oncoming fuel source are purged of air and filled with fuel when required to supply turbine load.

FIG. 7 illustrates high nozzle temperatures resulting from low liquid fuel flow during fuel transfers under the prior art method. The left vertical axis indicates values for megawatt output 710, liquid fuel stroke reference 720, gas fuel stroke reference 730 and percent liquid fuel 740. The right vertical axis indicates values for nozzle temperatures 750, 760, 770 at various locations around the turbine. As fuel is transferred from liquid fuel to a gas fuel, the percent liquid fuel 740 decreases at a constant ramp rate and the gas fuel stroke reference 720 ramps up reflective of gas fuel flow to the combustor. When the percent liquid fuel 740 drops below about 10%, nozzle temperatures 750, 760, 770 begin to rise, continuing to increase as percent liquid fuel 740 drops to 0%. Nozzle temperature 750, 760, 770 finally drop 780 as a result of liquid fuel purge coming on.

Accordingly, there is a need to conduct fuel transfers in a manner, which increases reliability and decreases the potential for hardware damage and wear, thereby prolonging life of the equipment. Also, there is a need to perform the modified transfers without the need for hardware changes and the associated cost and time for such modifications.

BRIEF DESCRIPTION OF THE INVENTION

The present invention relates to a method by which transfers between offgoing and oncoming sources of fuel for a gas turbine may be controlled to minimize the time spent in adverse operational conditions that may cause damage to gas turbine equipment.

Briefly in accordance with one aspect of the present invention, a method is provided for performing a transfer from an offgoing fuel type to an oncoming fuel type in a gas turbine. The method includes completing a fuel prefill for the oncoming fuel type through the fuel system and determining if a total fuel demand for the oncoming fuel type is greater than a predetermined flow rate for the oncoming fuel type.

The method also includes selecting a fuel transfer rate for the oncoming fuel type and transferring from the offgoing fuel type to the oncoming fuel type at the selected fuel transfer rate. Further, the method includes determining if the offgoing fuel flowrate has decreased below a predetermined flow rate for the offgoing fuel type, selecting a final fuel transfer rate for the oncoming fuel type and completing the transfer from offgoing fuel type to oncoming fuel type at the selected final fuel transfer rate.

In accordance with a further aspect of the present invention, a method is provided for performing a transfer from an offgoing fuel type to an oncoming fuel type in a gas turbine. The method includes initially decreasing fuel flowrate from an offgoing fuel type and increasing fuel flowrate from an oncoming fuel type at a fast fuel transfer rate when adverse combustion conditions exist for the combustion system of the oncoming fuel type are avoided and simultaneously when total fuel demand for the oncoming fuel type doe not exceed a fast fuel transfer limit. Then the method includes decreasing fuel flowrate from the offgoing fuel type and increasing fuel flowrate from the oncoming fuel type at a slow fuel transfer rate for the offgoing fuel type when at least one of adverse combustion conditions exist for the combustion system of the offgoing fuel type due to low flowrate no longer exist and total fuel demand for the oncoming exceeds a fast fuel transfer limit. Further, the method includes decreasing fuel flowrate from the offgoing fuel type and increasing flow from the oncoming fuel type at the fast fuel transfer rate when adverse combustion conditions exist for the combustion system of the oncoming fuel type due to low flow and simultaneously when total fuel demand for the oncoming fuel type does not exceed a fast fuel transfer limit.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
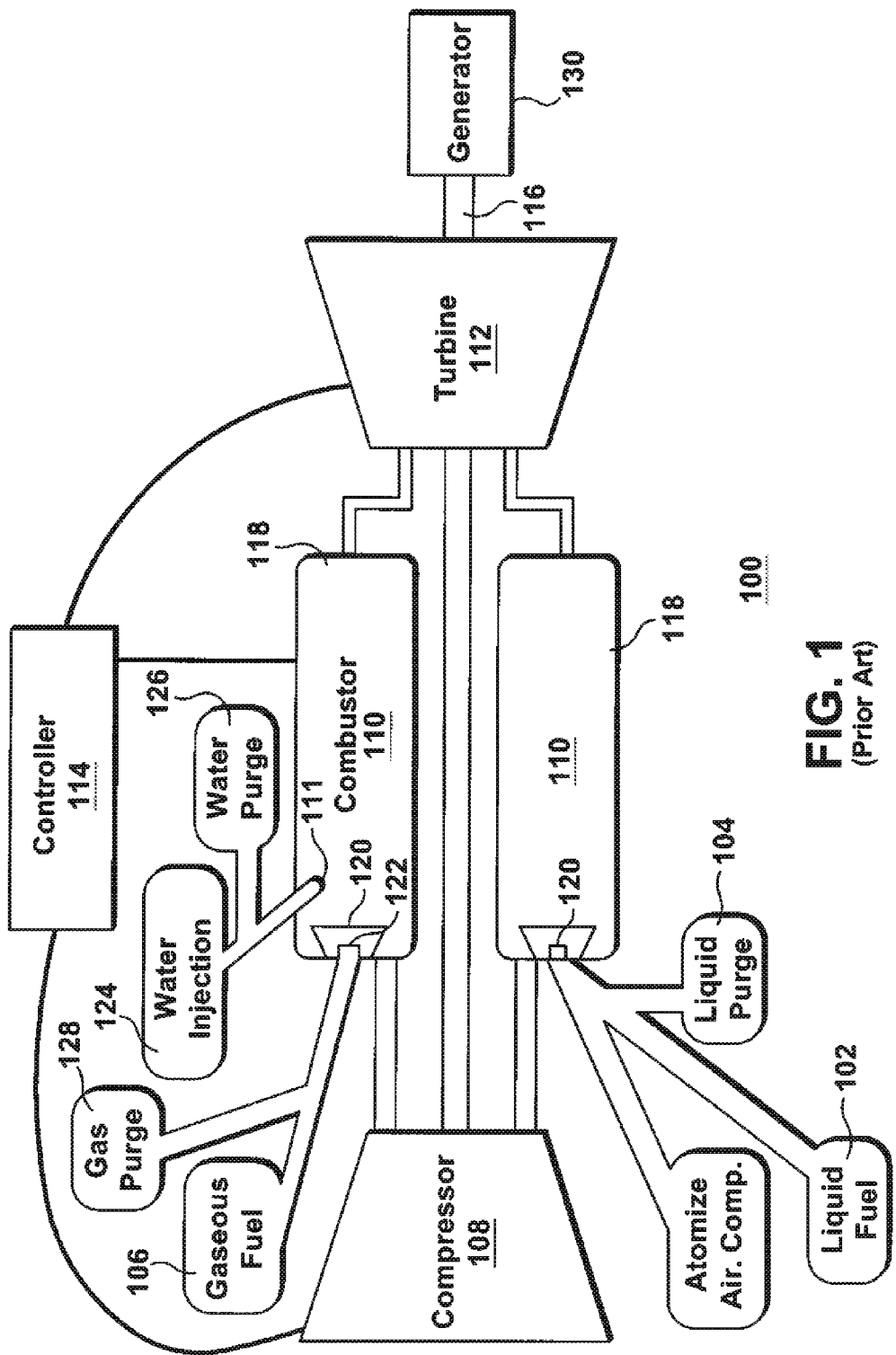
FIG. 1 is a simplified schematic diagram of an exemplary gas turbine having liquid and gas fuel systems.
Figure 2:
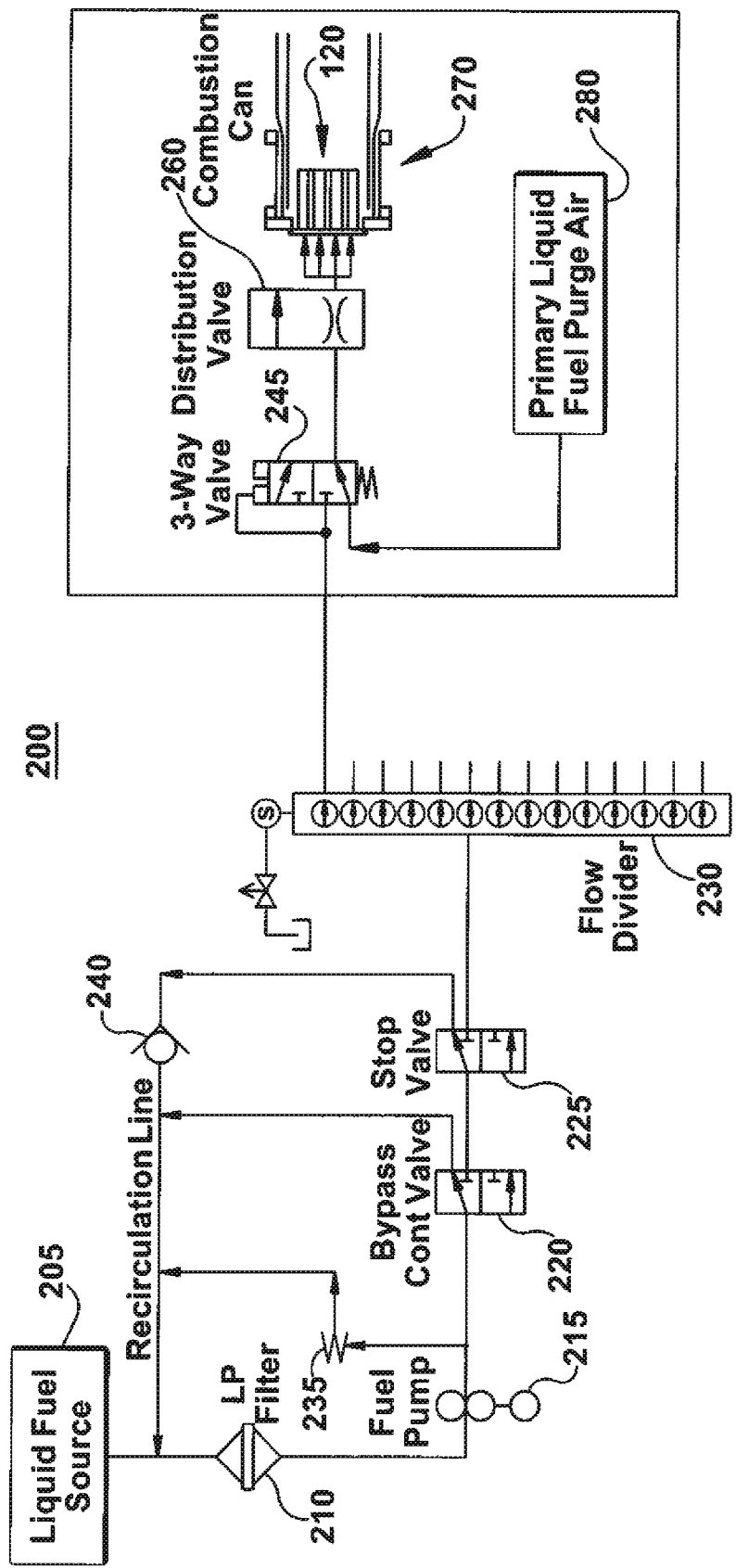
FIG. 2 is a simplified diagram of a gas turbine engine with an existing liquid fuel system.
Figure 3:
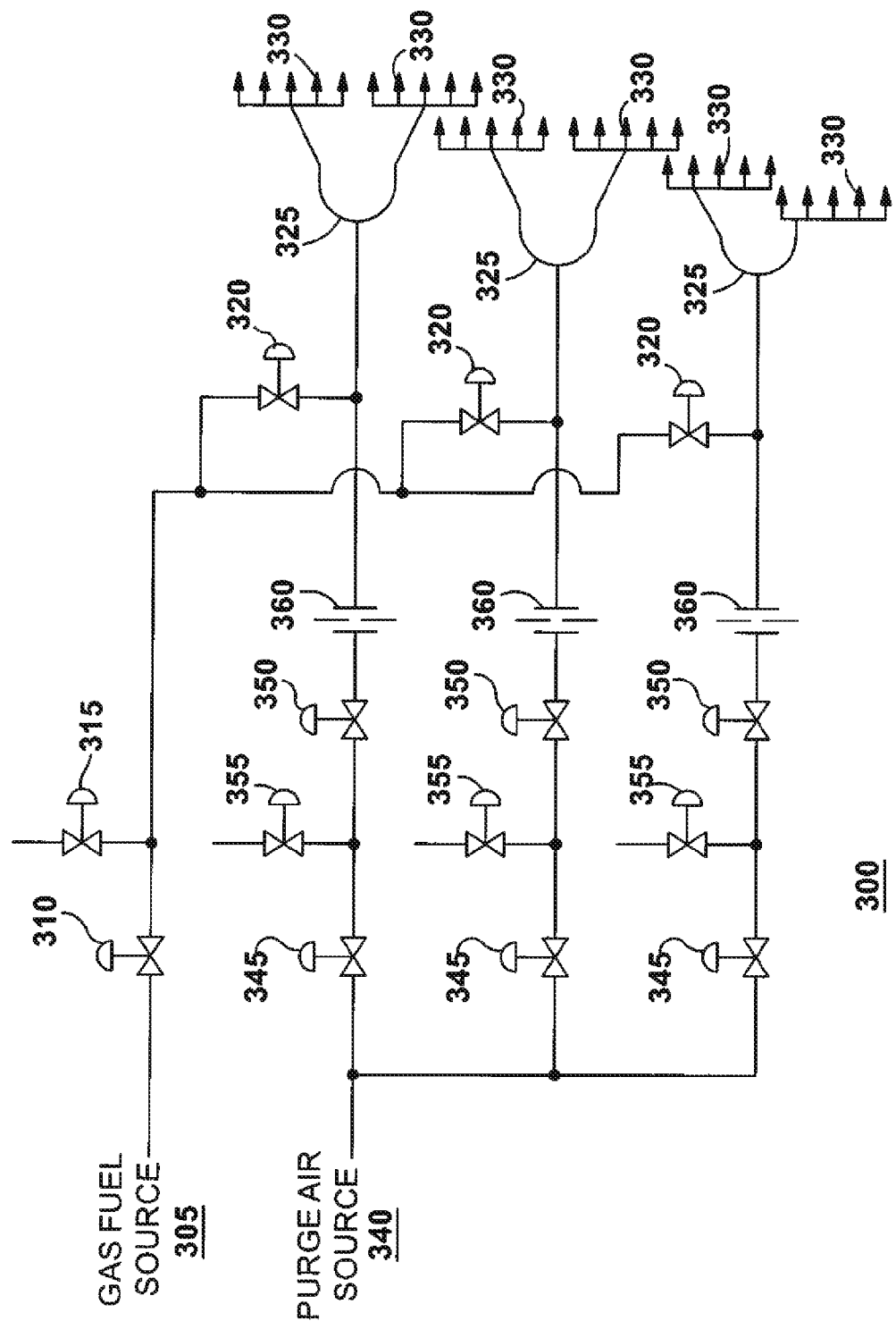
FIG. 3 is a simplified diagram of a gas turbine engine with an existing gas fuel system.
Figure 4:
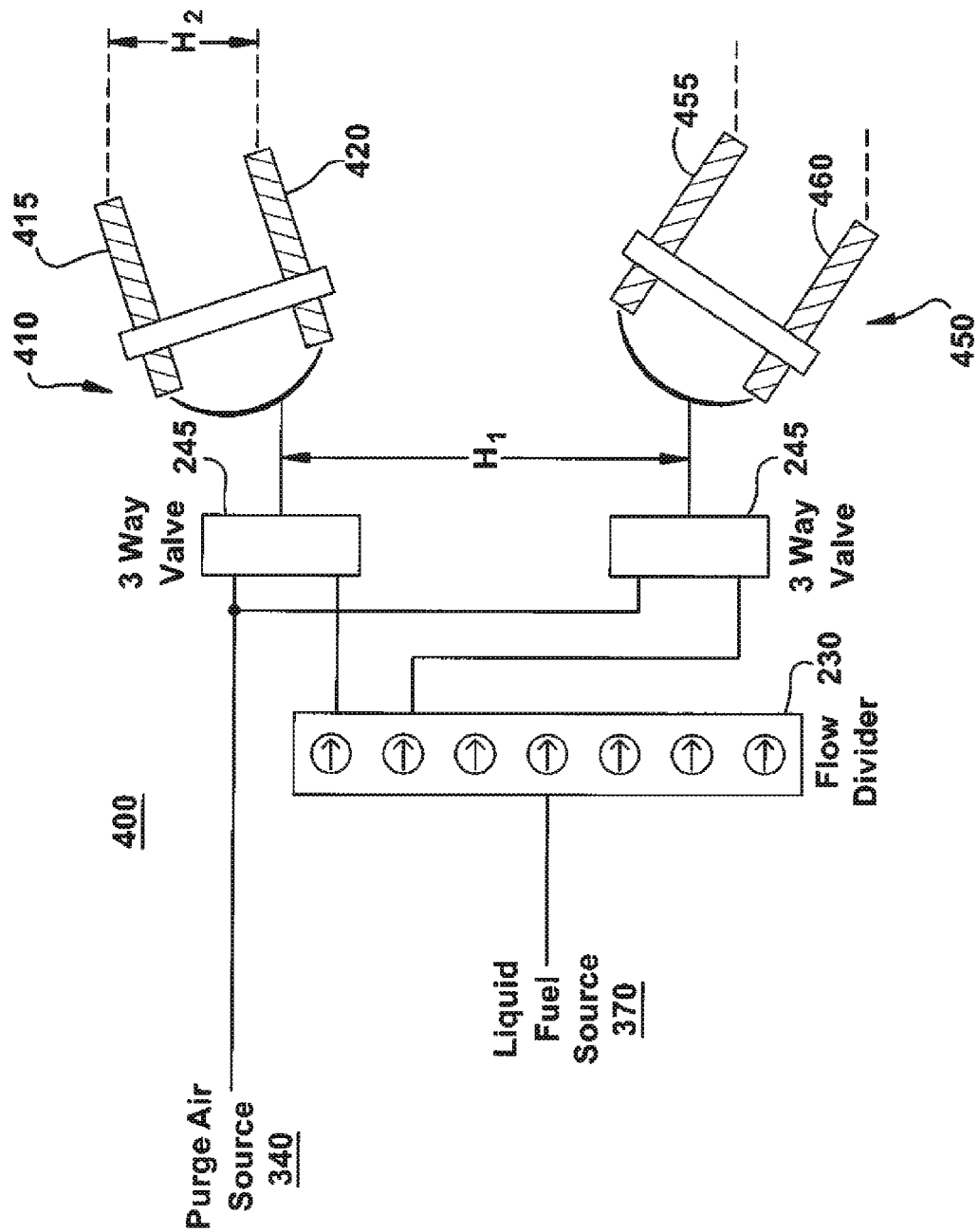
FIG. 4 illustrates differences in head required for liquid fuel to flow through liquid fuel nozzles within a combustor can dependent on valve positions.
Figure 5:
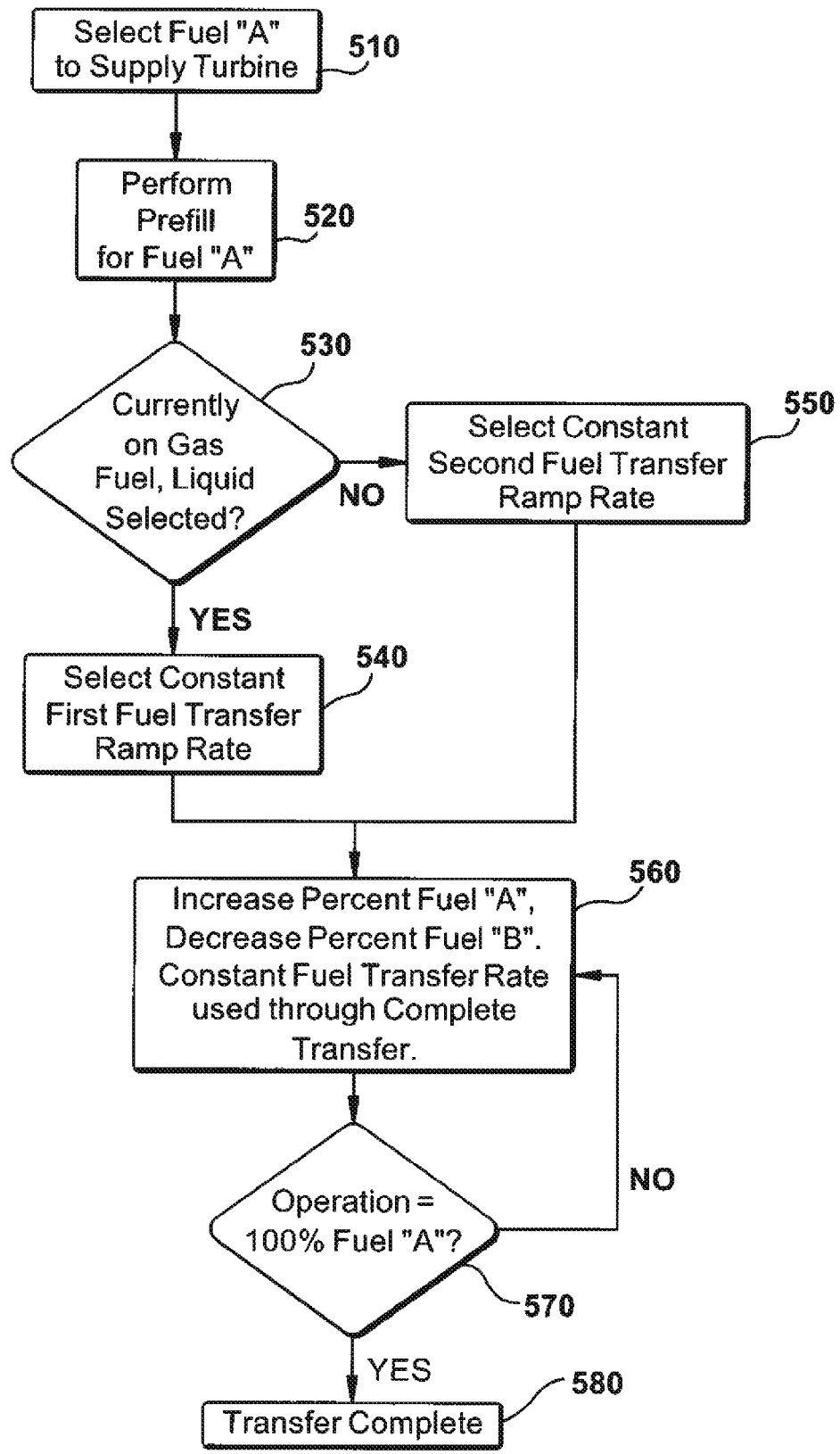
FIG. 5 illustrates a prior art algorithm for control of a transfer between fuel types.
Figure 6:
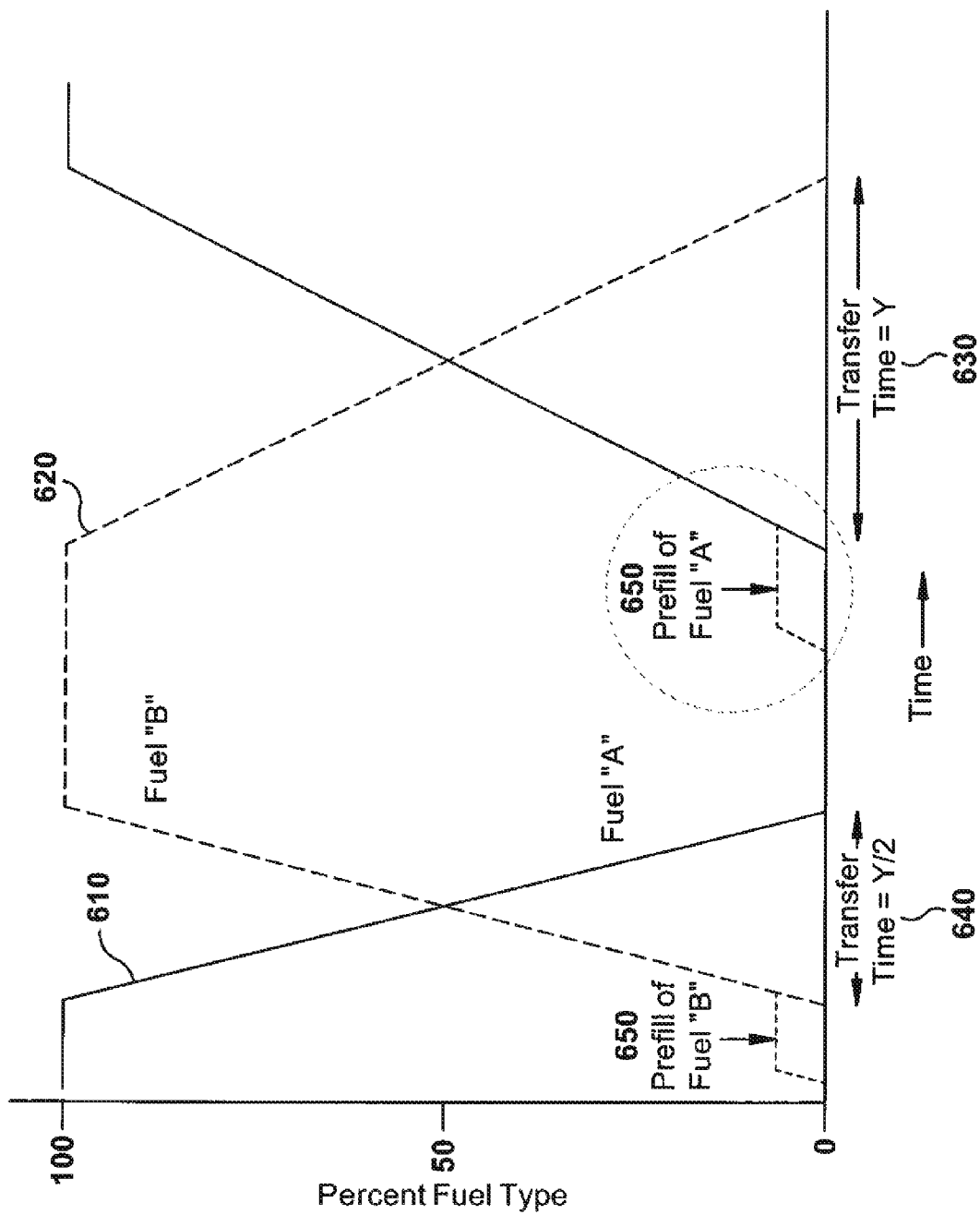
FIG. 6 illustrates simplified fuel transfer rates for fuel transfers from fuel "A" to fuel "B", and for transfers from fuel "B" to fuel "A" under a prior art method.
Figure 7:
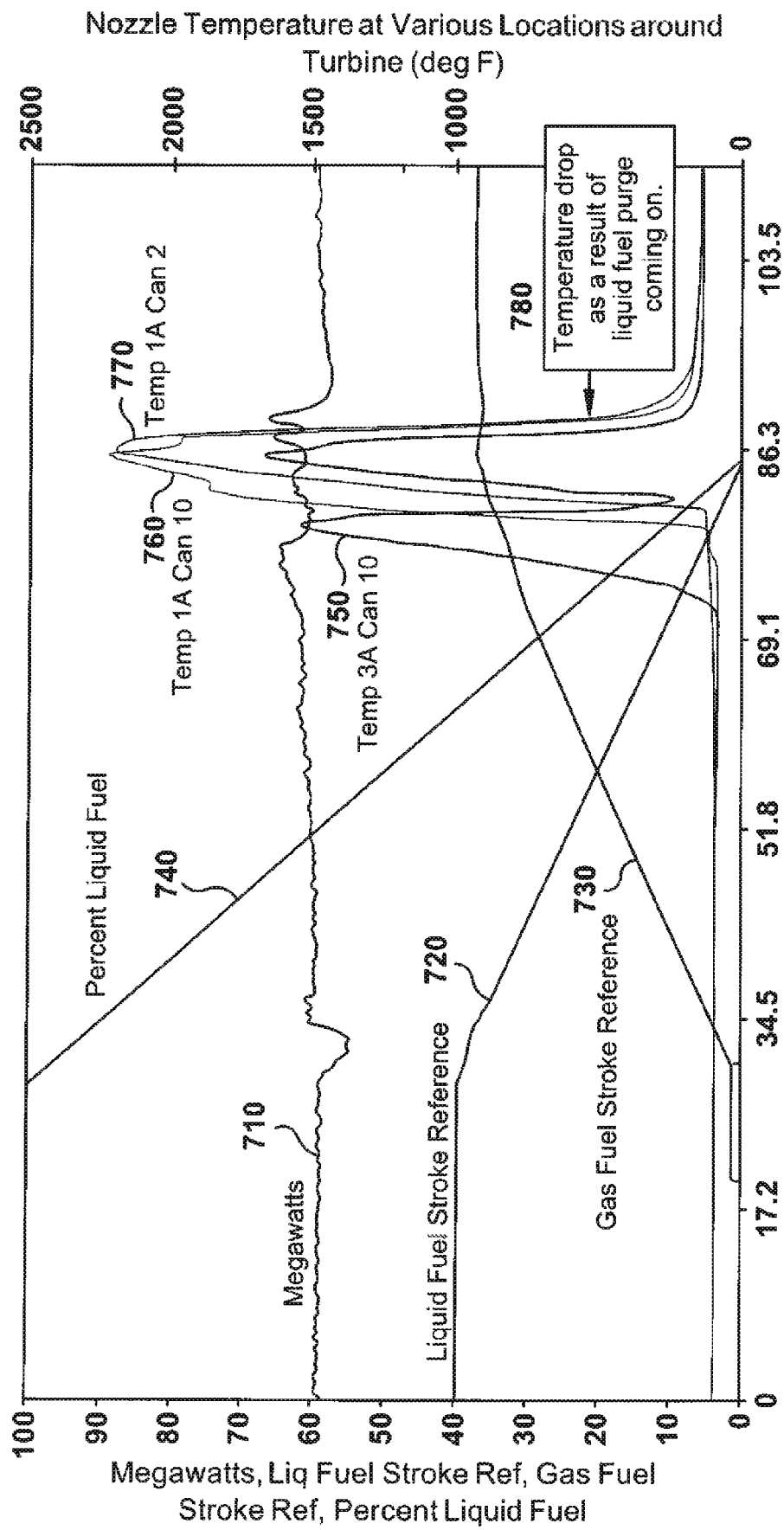
FIG. 7 illustrates response of high nozzle temperatures resulting from low liquid fuel flow during fuel transfers under the prior art method.

The following embodiments of the present invention have many advantages, including providing methods for transfers from liquid fuel to gas fuel and vice versa so the exposure of combustors and nozzles to adverse operational conditions resulting from low liquid fuel flow and low gas fuel flow are minimized.

Both of the problems described above result from hardware limitations, and the need is to be able to quickly get through the low flow conditions of fuel at both the beginning and end of the transfer. Moving quickly through these operational areas eliminates the increased wear or potential damage with minimum side effects on the rest of the system and overall turbine operation.

According to one aspect of the present invention, the rate of transfer between fuels is no longer a linear function but instead a multiple segment curve that is used to quickly get through problem areas of a fuel transfer. Aspects of the invention address problem areas of the transfer that can occur at both ends of the fuel transfer and when transferring in either direction or to any fuel.

Dual fuel gas turbines historically experience problems during gas to liquid fuel transfers. This invention corrects one of the major reliability issues, using a purely software based solution. This software is applicable to all dual fuel gas turbine engines, and offers increased confidence in gas to liquid fuel transfers and liquid to gas fuel transfers. As a result, improved functionality is provided for both emergency backup transfers and for operation flexibility. Increasing reliability of the liquid fuel system (and by extension, customer confidence in it) is an important step in making liquid fuel and hence dual fuel control more viable options.

The object of the invention is to decrease risk of potential damage or wear on gas turbine hardware during low fuel flow operations seen during fuel transfers, prolonging hardware life. Each time a fuel transfer is initiated, two low fuel flow points are seen. The first is the initiation of fuel into the turbine of the fuel being transferred to at the beginning of the transfer; the second is the low fuel flow of the original fuel as it ramps completely off at the end of the transfer.

Increasing the fuel transfer ramp rate while at low fuel flow conditions reduces or eliminates the opportunity for increased wear or potential damage on turbine hardware during this short transient. Overall fuel transfer time needs to remain similar to historical time due to timing of valves elsewhere in the system.

With a non-linear fuel transfer process, after a fuel transfer has been initiated, a prefill of the oncoming fuel type is completed. A decision is made to determine if the prefill flow rate for the oncoming fuel type is high enough to prevent any of the adverse combustion conditions previously discussed regarding low fuel flows.

If the prefill flowrate for the oncoming fuel type is not greater than a fuel flowrate for the oncoming fuel type which will prevent adverse combustion conditions, it is then determined if the prefill flowrate is higher than the maximum allowable limit for the fast fuel transfer rate. The maximum allowable limit for fuel demand during the fast fuel transfer ensures rapid fuel transfer rates are turned off in the middle of the fuel transfer to allow time for a successful transition from one fuel to another. Moving too fast while running on mixed fuel in the middle of the transfer could result in loss of flame in one or more of the combustion cans and/or unstable unit operation (output).

The fast fuel transfer ramp rate is selected and percent fuel demanded of destination fuel is increased until one of the two conditions discussed in the prior paragraph are met. The fastest fuel transfer rate must not be faster than either fuel system is capable of meeting to ensure proper control of the turbine is maintained.

Once exceeding either the limit to prevent potential hardware damage or the maximum allowed limit for fast fuel transfers at transfer initiation, a slow fuel transfer rate is selected and the unit continues to transfer to the oncoming fuel type. The slow rate remains in use until the tail end of the transfer.

Similar to the beginning of the transfer, there are two requirements to determine when to switch back to the fast transfer rate at the end of the fuel transfer. First, the fuel flow of the offgoing fuel type has dropped to a low flow and is in danger of increased hardware wear and/or potential hardware damage as previously described. The second requirement is imposed to prevent transferring too quickly through the middle of the transfer and causing flame-out of a combustion can. Once both requirements are met a fast fuel transfer rate is again selected and percentage of destination fuel flow demanded is increased until fuel transfer is complete.

Because liquid fuel nozzle hardware temperature data was available for testing, the breakpoints of the fuel transfer curve may be determined by liquid fuel flow rates. The liquid fuel flowrate requirements to avoid adverse combustion condition (required to provide sufficient head to flow liquid to all nozzles) are greater than the minimum gas fuel flowrate requirement. Therefore, using liquid fuel hardware temperatures and corresponding liquid fuel flowrate demands to determine all points of the fuel transfer curve is conservative with respect to minimum gas fuel type flowrates to avoid adverse combustion conditions.

Figure 8:
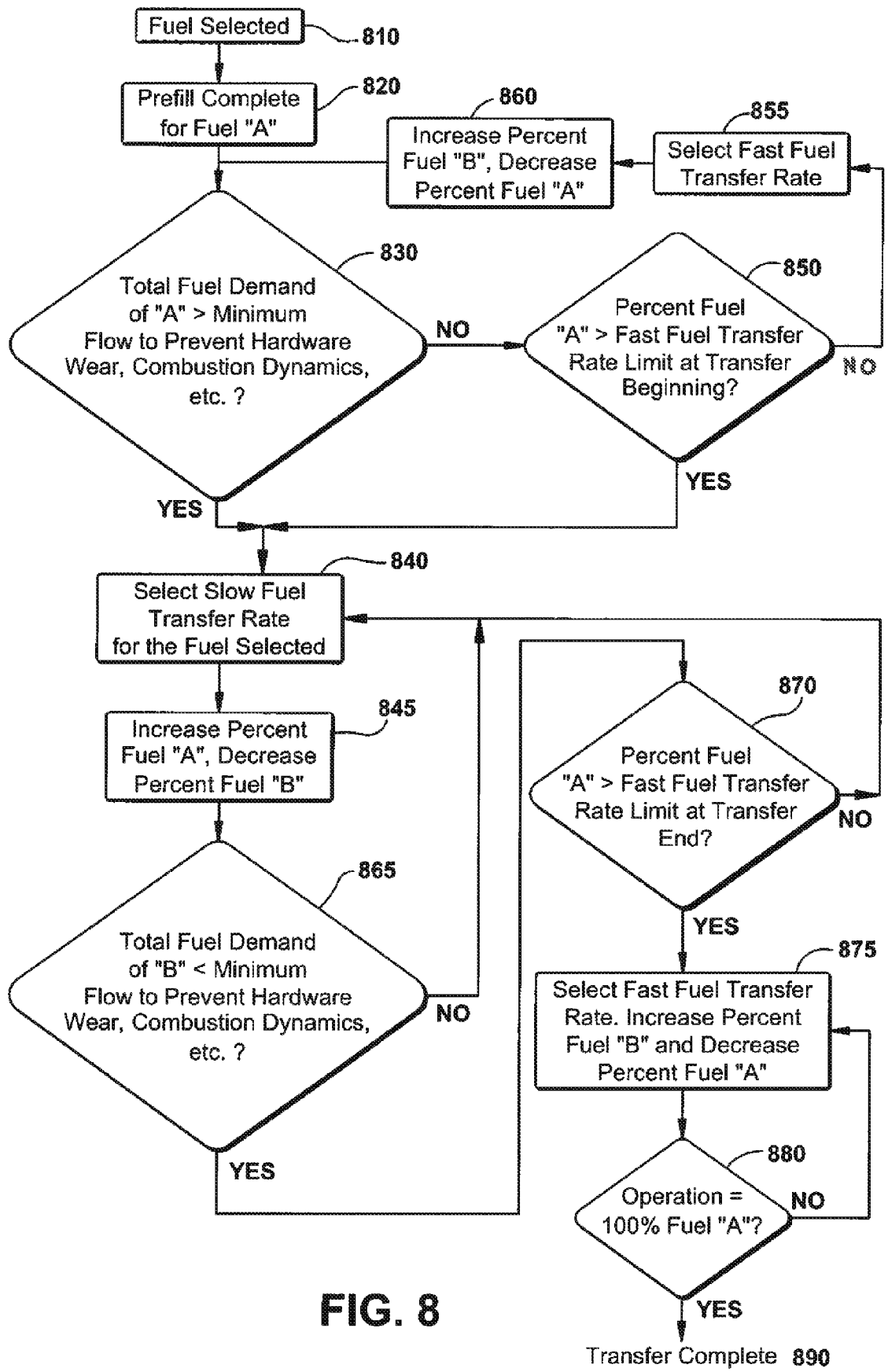
FIG. 8 illustrates a flowchart for an inventive algorithm for fuel transfer incorporating scheduled high flow rates during the transfer.

FIG. 8 illustrates an inventive algorithm for control of a transfer between fuel types. For exemplary purposes the fuel types are described as fuel "A" and fuel "B". The algorithm provides for a transfer from fuel "B" to fuel "A" (fuel "B" is the offgoing fuel type and fuel "A" is the oncoming fuel type). Initially in step 810, the fuel type to which the load will be transferred (oncoming fuel source) is selected and designated as fuel "A". In step 820, a fuel prefill is completed with fuel "A". In step 830 it is determined whether the total fuel demand of fuel "A" is greater than a minimum flow to prevent adverse operational conditions on the combustor nozzles for fuel "A". If the total fuel demand of fuel "A" per step 830 is above the minimum flow to prevent adverse operational conditions on the combustor nozzles for fuel "A", then in step 840 a slow fuel transfer rate is selected since there is no need to rapidly increase fuel "A" flow.

If total fuel demand is not above the minimum flow to prevent adverse operational conditions, then in step 850 it is determined whether the percent fuel "A" is greater than fast fuel transfer rate limit at the beginning of the transfer. The fast fuel transfer limit is the maximum fuel demand for fuel "A" for which a successful fast fuel transfer rate can be carried out. If the percent fuel "A" is above the fast fuel transfer rate limit, then a fast fuel transfer rate should not be selected, but the slow fuel transfer rate should be chosen as in step 840. The limit ensures that rapid fuel transfer rates are turned off in the middle of the fuel transfer to allow time for a successful transition from one fuel to another. Moving too fast while running on mixed fuel in the middle of the transfer could result in loss of flame in one or more of the combustion cans and/or unstable unit operation (output).

If instead the percent fuel "A" is below the allowable limit for fast fuel transfer rate, then the fast fuel transfer rate is chosen in step 855. Fuel is transferred from fuel "A" to fuel "B" at the fast fuel transfer rate until it is determined that either the total fuel demand on fuel "A" is above the minimum flow to prevent adverse operational conditions on the combustor nozzles for fuel "A" in step 830 or that the percent fuel "A" is above the fast fuel transfer rate limit.

Then in step 840, the slow fuel transfer rate is selected and the fuel "A" is increased and fuel "B" is decreased at the slow fuel transfer rate while checking in step 865 to determine if total fuel demand of fuel "B" is less than minimum flow to prevent adverse operational conditions associated with fuel "B" system. If the total fuel demand is step 865 is not below the minimum flow to prevent adverse operational conditions associated with fuel "B" system, then the fuel transfer continues at a the low fuel transfer rate in step 840. If the total fuel demand of fuel "B" is less than the minimum flow to prevent adverse operational conditions, the percent fuel "A" is checked step 840 to determine if it is above the fast fuel transfer rate limit. If the percent fuel "A" is above the fast fuel transfer rate limit, the fuel transfer rate is shifted to slow fuel transfer rate in step 840 to avoid loss of flame or operational instability as previously described. However, If the percent fuel "A" is less than or equal to the fast fuel transfer rate limit, then the fast fuel transfer rate is selected in step 875. Fuel transfer continues in step 880 at the fast fuel transfer rate until operation is at 100% fuel "A", when the transfer is complete in step 890.

Figure 9:
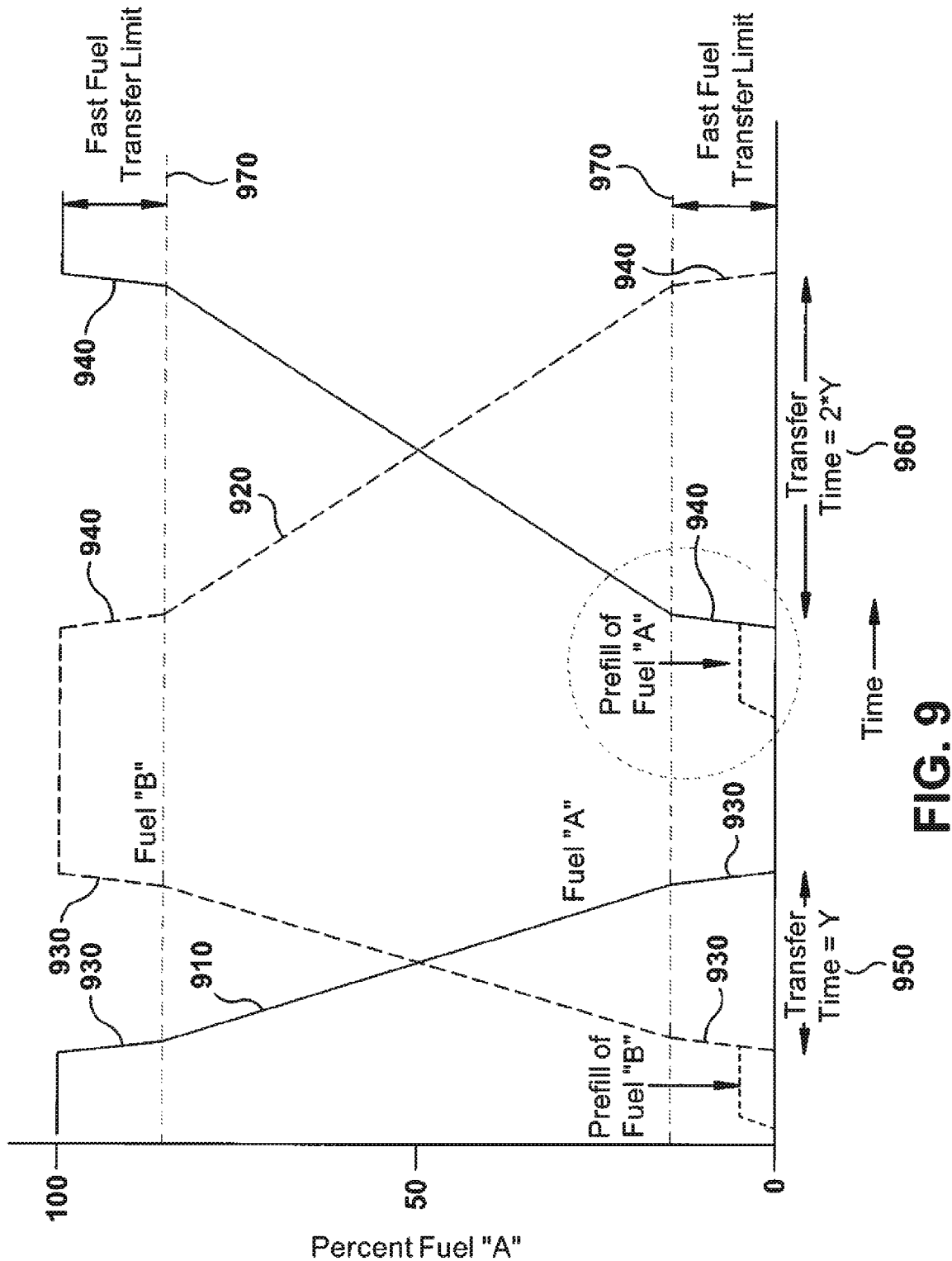
FIG. 9 illustrates simplified fuel transfer rates for fuel transfers from fuel "A" to fuel "B", and for transfers from fuel "B" to fuel "A" under the inventive method.

FIG. 9 illustrates simplified fuel transfer rates for fuel transfers from fuel "A" to fuel "B" and for transfers from fuel "B" to fuel "A" under the inventive algorithm. The vertical axis represents the percent of a fuel type that is being supplied during two fuel transfer operations. The horizontal axis represents an unscaled time axis showing the relative transfer times during the two fuel transfer operations. The solid curve 910 represents fuel type "A". The dashed line 920 represents fuel type "B".

The fast fuel transfer rate 930 from fuel "A" to fuel "B" (the initial slope at the beginning of the transfer and the final slope at the end of the transfer) has the same value as the fast transfer 940 rate at both ends of the transfer from fuel "B" to fuel "A".

Again referring to FIG. 9, the slow fuel transfer rate from fuel "A" to fuel "B" is selected to maintain a fixed total transfer time shown as Y (after accounting for the time expended during the fast transfer segments). The slow fuel transfer rate from fuel "B" to fuel "A" is selected to maintain a fixed total transfer time shown as 2Y (after accounting for the time expended during the fast transfer segments). The breakpoints between the fast fuel transfer rate and the slow fuel transfer rates are fixed at the fast fuel transfer limit. The slope of transfer rate 910 is illustrated as about twice at high as the slope (transfer rate 920) from fuel "B" to fuel "A". The total transfer time for a fuel transfer from fuel "B" to fuel "A" is twice that of the reverse transfer.

In a preferred embodiment of a fuel transfer from an offgoing gas fuel type to an oncoming liquid fuel type, the transfer lasts about 33 seconds. In the transfer from an offgoing liquid fuel to an oncoming gas fuel, the transfer lasts about 66 seconds. Further, in a preferred embodiment for the fuel transfers, the fast transfer ramp rates are set at about 10% fuel load per second for both the offgoing fuel type and the oncoming fuel type. The fast transfer rate of 10% fuel load per second is also preferably employed for both liquid and gas fuel types. The slow ramp rate for the remaining (slow transfer rate) segment of the fuel transfer is determined by calculating the required slow ramp rate to complete the transfer in about 33 seconds for gas fuel to liquid fuel transfers and about 66 seconds for liquid fuel to gas fuel transfers. The slow transfer rates may vary from about 0.9% per second to about 3% per second. Further in a preferred embodiment the fast transfer fuel limit is about 25%.

Further aspects of the may include dynamics measurements taken within the combustion cans during low gas fuel flows to further optimize breakpoints of the non-linear transfer curve. Gas nozzles may also be instrumented in a similar manner to determine the exact fuel split function relation, and rate of fuel transfer could be scheduled as a function of load or other factors to further optimize the non-linear transfer curve. The above described instrumentation may result in a more refined fuel transfer curve across the entire range of fuel splits and load ranges, and in any transfer direction.

This inventive method is not limited to liquid to gas transfers, but also may include transfers between natural gas fuel to and from Syn-gas systems (dual gas).

Figure 10A:
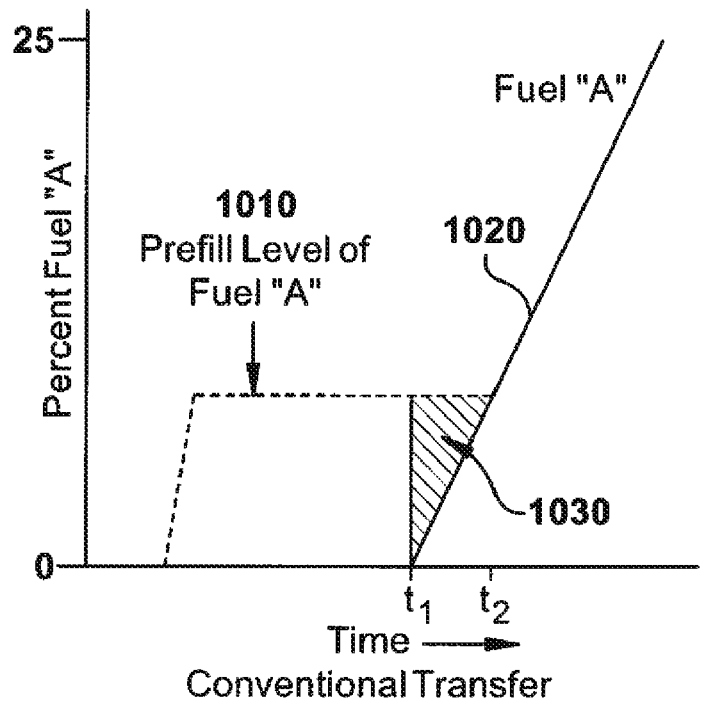
FIGS. 10A-10B illustrates a comparison of fuel prefill under the prior art and the inventive non-linear fuel transfer method.
Figure 10B:
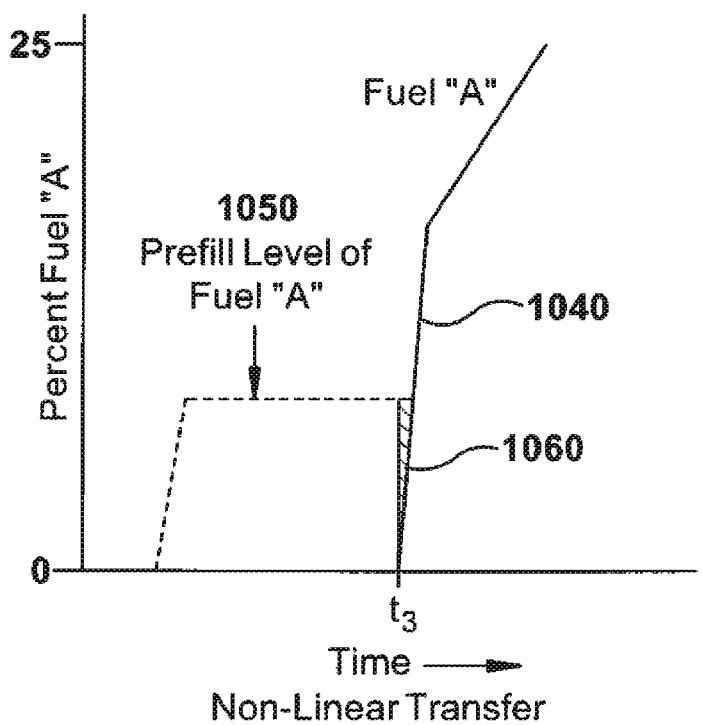

FIGS. 10A and 10B illustrate a comparison of fuel prefill under the prior art and the inventive non-linear fuel transfer methods. An additional benefit of the new non-linear transfer is that the total fuel system disturbance due to uncontrolled prefill fuel is lessened.

Prefill establishes a low initial fixed flow rate for the oncoming fuel source to ensure that the fuel lines are emptied of purge air and filled with oncoming fuel before the fuel is demanded in a signal for load control of the turbine. The prefill 1010 is established by a positioning a fuel control valve to create the desired prefill flow rate. At the end of the prefill period $t_1$, a ramp transfer rate is established for the oncoming fuel source, shown as fuel "A". While the ramp control transfer rate initially calls for a 0% flow of fuel "A", the position of the control valve is maintained at the prefill position (maintaining the prefill flow) until $t_2$ when a higher fuel is demanded and the control valve is further opened. In the period between $t_1$ and $t_2$, the shaded area 1020 represents the quantity of uncontrolled fuel that is introduced to the combustors above the fuel demanded for turbine control. This uncontrolled fuel causes megawatt power and temperatures for the gas turbine to transiently rise above demanded levels.

FIG. 10 B illustrates a higher ramp rate 1040 (slope) for fuel "A". Due to the higher ramp rate 1040 for fuel "A", the controlled fuel demanded by the turbine control rises quickly from $t_3$ to above the prefill level 1050, resulting in less uncontrolled fuel 1060 reaching the combustors, thereby significantly limiting the disturbance associated with the introduction of uncontrolled fuel.

Figure 11:
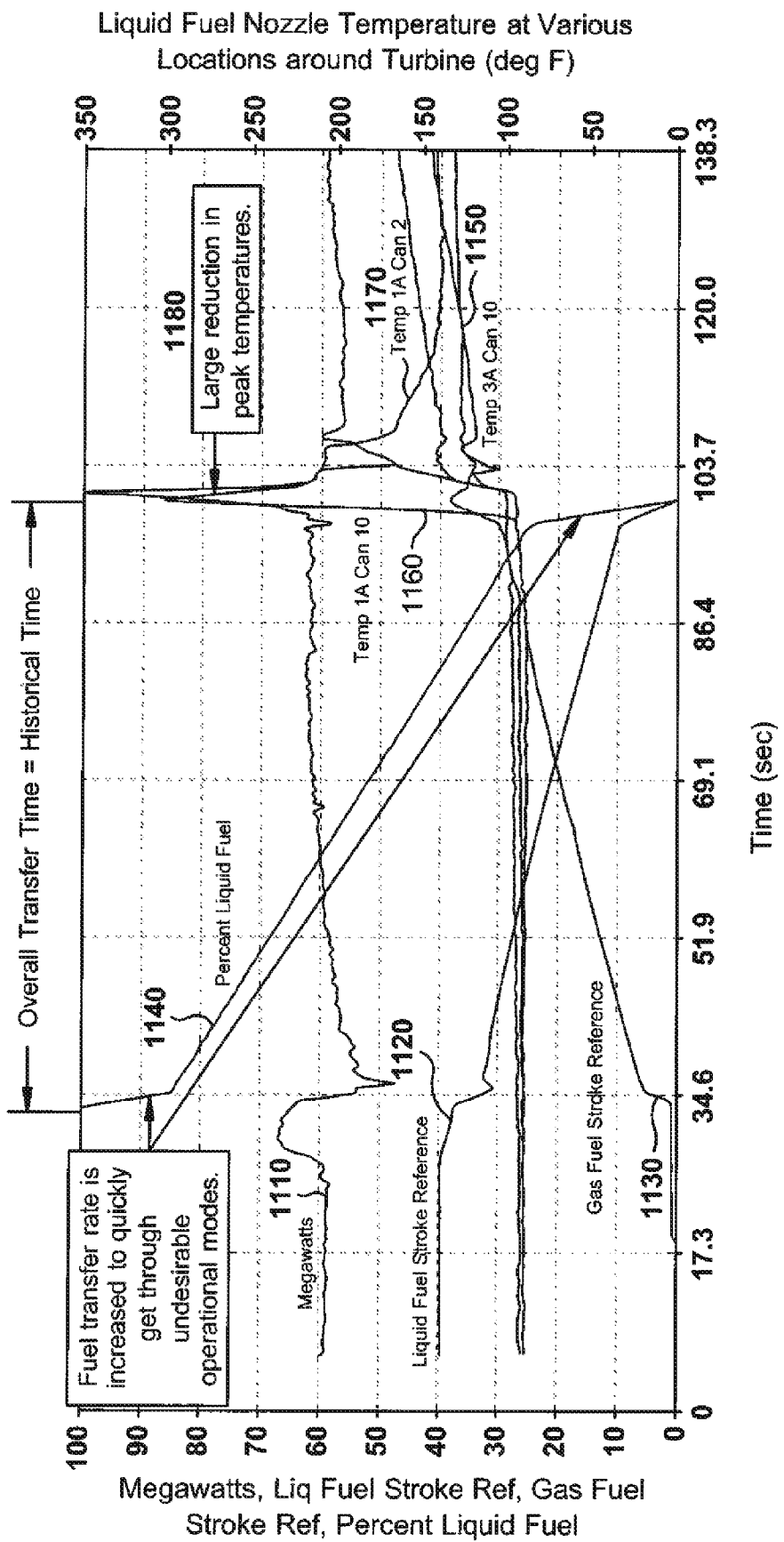
FIG. 11 illustrates lower fuel nozzle temperatures resulting from non-linear fuel transfer rates during fuel transfers under the inventive method.

FIG. 11 illustrates lower fuel nozzle temperatures resulting from non-linear fuel transfer rates during fuel transfers under the inventive method, where the fuel transfer rate is shifted at critical points to quickly pass through undesirable operational modes. Field data from testing with a GE 9FA turbine site with the inventive algorithm is displayed.

The left vertical axis indicates values for megawatt output 1110, liquid fuel stroke reference 1120, gas fuel stroke reference 1130 and percent liquid fuel 1140. The right vertical axis indicates values for nozzle temperatures at various locations around the turbine. As fuel transfer is initiated from liquid fuel to a gas fuel, the percent liquid fuel 1140 is initially reduced at a high ramp rate and the gas fuel is initially increased at a high ramp rate such that the gas fuel is quickly increased to about 6% rated flow. Liquid fuel 1140 then is decreased at a reduced constant ramp rate and the gas fuel stroke reference 1130 ramps up reflective of gas fuel flow to the combustor.

When the percent liquid fuel drops to about 27%, a higher ramp rate for liquid fuel reduction is again initiated, until the percent liquid fuel is shut off. Coincident with the higher rate decrease for liquid fuel, is a higher ramp up of the gas fuel to 100% flow (rate of about 10% fuel demand/sec). Nozzle temperatures 1150, 1160, 1170 begin to rise when percent liquid fuel drops 1140 below about 27%, continuing to increase as the percent liquid fuel flow 1140 drops to 0%.

Originally with the prior art transfer method, the low liquid fuel flows at the beginning of a gas to liquid transfer and end of liquid to gas transfer, liquid fuel nozzle temperatures would exceed 2000 deg F. Over time this high temperature spike could damage the hardware and make liquid fuel operation difficult, as proper atomization of the liquid fuel for burning would not take place. Similar damage to gas fuel nozzle could take place (typically on the diffusion nozzles which are exposed to the flame front).

With the accelerated ramp rates at the beginning and end of the fuel transfer process, liquid fuel nozzle temperature 1150, 1160, 1170 spikes are limited 1180 to approximately 300 deg F. Analysis has shown 300 deg F. to be well within design parameters and will not result in any hardware damage or increased wear in the long term. Nozzle temperatures subsequently drop due to the initiation of an air purge of the liquid fuel system with its consequent cooling effect on the liquid fuel nozzles.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for performing a transfer from an offgoing fuel type to an oncoming fuel type in a gas turbine, the method comprising:
    completing a fuel prefill for the oncoming fuel type through a fuel system;
    determining if a total fuel demand for the oncoming fuel type is greater than a predetermined flow rate for the oncoming fuel type;
    selecting a fuel transfer rate for the oncoming fuel type;
    transferring from the offgoing fuel type to the oncoming fuel type at the selected fuel transfer rate;
    determining if the offgoing fuel flowrate has decreased below a predetermined flow rate for the offgoing fuel type;
    selecting a final fuel transfer rate for the oncoming fuel type; and
    completing the transfer from offgoing fuel type to oncoming fuel type at the selected final fuel transfer rate.

2. The method for performing a transfer from a offgoing fuel type to an oncoming fuel type in a gas turbine according to claim 1, wherein the predetermined flow rate for the oncoming fuel type is established avoid adverse operational combustion conditions for combustors of the gas turbine.

3. The method for performing a transfer from a offgoing fuel type to an oncoming fuel type in a gas turbine according to claim 2, wherein the adverse operational conditions for combustors of the gas turbine include at least one of combustion hardware damage and combustion dynamics.

4. The method for performing a transfer from a offgoing fuel type to an oncoming fuel type in a gas turbine according to claim 1, wherein the step of selecting a fuel transfer rate comprises selecting a slow fuel transfer rate for the oncoming fuel type if the total fuel demand for the oncoming fuel type is greater than the predetermined flow rate for avoiding adverse operational conditions for the combustors.

5. The method for performing a transfer from a offgoing fuel type to an oncoming fuel type in a gas turbine according to claim 1, wherein the step of selecting a fuel transfer rate comprises selecting a slow fuel transfer rate for the oncoming fuel type
    if the total fuel demand for the oncoming fuel type is not greater than a predetermined flow rate for avoiding adverse operational conditions for the combustors; and
    a flowrate for the oncoming fuel type at the beginning of the transfer exceeded a fast fuel transfer rate limit.

6. The method for performing a transfer from a offgoing fuel type to an oncoming fuel type in a gas turbine according to claim 1, the step of selecting a fuel transfer rate further comprising selecting a slow transfer rate to establish a total fuel transfer time to be about half as long for a gas fuel being the oncoming fuel type as for a liquid fuel being the oncoming fuel type.

7. The method for performing a transfer from an offgoing fuel type to an oncoming fuel type in a gas turbine according to claim 1, the step of selecting a fuel transfer rate comprising:
    selecting a fast fuel transfer rate for the oncoming fuel type if the total fuel demand for the oncoming fuel type is not greater than a predetermined flow rate for the oncoming fuel type for avoiding adverse operational conditions for the combustors, and
    a flowrate for the oncoming fuel type at the beginning of the transfer did not exceed a fast fuel transfer rate limit.

8. The method for performing a transfer from a offgoing fuel type to an oncoming fuel type in a gas turbine according to claim 7, wherein the fast fuel transfer rate limit setting turns off the fast fuel transfer rate in the middle of the fuel transfer, allowing time for a successful transition from the offgoing fuel type to the oncoming fuel type.

9. The method for performing a transfer from a offgoing fuel type to an oncoming fuel type in a gas turbine according to claim 1, the step of determining if total fuel demand for the offgoing fuel type is greater than a predetermined flow rate for the offgoing fuel type further comprises: setting the predetermined flow rate for the offgoing fuel type to avoid adverse operational combustion conditions.

10. The method for performing a transfer from a offgoing fuel type to an oncoming fuel type in a gas turbine according to claim 9, the step of setting the predetermined flow rate to avoid adverse operational combustion conditions for the offgoing fuel type comprising: setting the predetermined flow rate for the offgoing fuel to avoid at least one of combustion hardware damage and combustion dynamics.

11. The method for performing a transfer from a offgoing fuel type to an oncoming fuel type in a gas turbine according to claim 9, the step of selecting a final fuel transfer rate for the oncoming fuel type comprising: selecting a slow fuel transfer rate for the offgoing fuel type unless a total fuel demand for the offgoing fuel type is below the predetermined flow rate to avoid adverse combustion conditions and a flowrate for the oncoming fuel type at an end of the transfer did not exceed a fast fuel transfer rate limit.

12. The method for performing a transfer from a offgoing fuel type to an oncoming fuel type in a gas turbine according to claim 9, the step of selecting a final fuel transfer rate comprising: selecting a fast fuel transfer rate for the final fuel transfer rate for the oncoming fuel type when a total fuel demand for the offgoing fuel type is below the predetermined flow rate to avoid adverse combustion conditions and a flowrate for the oncoming fuel type at an end of the transfer did not exceed a fast fuel transfer rate limit.

13. The method for performing a transfer from an offgoing fuel type to an oncoming fuel type in a gas turbine according to claim 12, wherein a fixed value for the fast fuel transfer rate is common to both the oncoming fuel type and the offgoing fuel type.

14. The method for performing a transfer from an offgoing fuel type to an oncoming fuel type in a gas turbine according to claim 12, wherein a value for the slow fuel transfer rate for the oncoming fuel type is applied to both the oncoming fuel type and the offgoing fuel type.

15. The method for performing a transfer from an offgoing fuel type to an oncoming fuel type in a gas turbine according to claim 14,
    wherein the fast fuel transfer rate comprises about 10% fuel load per second.

16. The method for performing a transfer from an offgoing fuel type to an oncoming fuel type in a gas turbine according to claim 15, wherein the slow fuel transfer rate is determined by calculating the slow ramp rate required to complete a transfer from the offgoing fuel to the oncoming fuel in about 33 seconds for a gas fuel to liquid fuel transfer and about 66 seconds for a liquid fuel to gas fuel transfer.

17. A method for performing a transfer from an offgoing fuel type to an oncoming fuel type in a gas turbine, the method comprising:
- decreasing fuel flowrate from an offgoing fuel type and increasing flow from an oncoming fuel type at a fast fuel transfer rate if a total fuel demand for the incoming fuel type is below a minimum flow to avoid adverse combustion conditions for the combustion system of the oncoming fuel type and simultaneously when percent fuel for the oncoming fuel type does not exceed a fast fuel transfer limit;
- decreasing fuel flowrate from the offgoing fuel type and increasing fuel flowrate from the oncoming fuel type at a slow fuel transfer rate if at least one of total fuel demand for the oncoming fuel type is above a minimum flow to avoid adverse combustion conditions for the combustion system and percent oncoming fuel type exceeds a fast fuel transfer limit; and
- decreasing fuel flowrate from the offgoing fuel type and increasing flow from the oncoming fuel type at the slow fuel transfer rate when total fuel demand for the oncoming fuel type is not above the minimum flow to avoid adverse combustion conditions for the combustion system and simultaneously when a percent for the oncoming fuel type exceeds a fast fuel transfer limit.

18. The method for performing a transfer from an offgoing fuel type to an oncoming fuel type in a gas turbine according to claim 17, further comprising: establishing a total fuel transfer time for a gas fuel to liquid fuel transfer at about half the total fuel transfer time for a liquid fuel to gas fuel transfer.

19. The method for performing a transfer from an offgoing fuel type to an oncoming fuel type in a gas turbine according to claim 17, further comprising:
- increasing oncoming fuel flowrate and decreasing offgoing fuel flowrate at a slow fuel transfer rate for the oncoming fuel type until the total fuel demand for the offgoing fuel type falls below a minimum flow value to prevent adverse combustion conditions for the combustors;
- continuing increasing oncoming fuel flowrate and decreasing offgoing fuel flowrate at a slow fuel transfer rate for the oncoming fuel if the percent of the oncoming fuel is not above the fast fuel transfer rate limit at an end of the transfer;
- increasing oncoming fuel flow rate and decreasing offgoing fuel flowrate at the fast fuel transfer rate if the percent of oncoming fuel is above the fast fuel transfer rate limit at the end of the transfer; and
- transfer is complete when gas turbine operation is fully on the oncoming fuel type.

20. The method for performing a transfer from an offgoing fuel type to an oncoming fuel type in a gas turbine according to claim 17, wherein the fast transfer rate is about 10% fuel load per second; the fast transfer rate limit is about 25% fuel load; and the slow fuel transfer rate is determined by calculating the slow ramp rate required to complete a transfer from the offgoing fuel to the oncoming fuel in about 33 seconds for a gas fuel to liquid fuel transfer and about 66 seconds for a liquid fuel to gas fuel transfer.

* * * * *